Jan. 26, 1960 L. CIGNETTI ET AL 2,922,577

DIGITAL COMPUTING APPARATUS

Filed Jan. 31, 1955

Inventors:
Luciano Cignetti
Siegfried Reisch
by W. R. Hulbert,
Atty.

United States Patent Office 2,922,577

Patented Jan. 26, 1960

2,922,577

DIGITAL COMPUTING APPARATUS

Luciano Cignetti and Siegfried Reisch, Ivrea, Italy, assignors to Ing. C. Olivetti & C., S.p.A., Ivrea, Italy, a corporation of Italy Application January 31, 1955, Serial No. 485,086

Claims priority, application Italy February 3, 1954

5 Claims. (Cl. 235—176)

The present invention relates to digital computing apparatus of the type wherein an accumulator is provided with a plurality of unit accumulating elements adapted to be sequentially commutated and is more specifically concerned with an improvement of the computing apparatus described in the copending application Serial Number 385,866, filed October 13, 1953, now U.S. Patent No. 2,887,269.

In said application the accumulator is cyclically movable so as to sequentially present its accumulating elements to a commutator device having means for sensing said elements and means for commutating said elements to enter a unit into the accumulator.

According to the apparatus described in said copending application the commutation of an accumulating element was effected substantially simultaneously with the sensing thereof, said commutation depending upon the result of said sensing. This mode of operation requires that the sensing means be highly sensitive, since they have to ascertain the actual condition of the accumulating element in time to cause the commutating means to commutate said element.

The purpose of the invention is to eliminate this disadvantage and to provide an apparatus by which the commutation of an accumulating element is no more depending on the sensing of the element itself.

In accordance with the invention we provide in a digital computing apparatus an accumulator having a plurality of unit accumulating elements each adapted to be commutated to assume either of two stable conditions, means for sensing said elements, means operable for commutating said elements and means for mounting said sensing means and said commutating means to enable said elements to be sequentially presented to said sensing means and to said commutating means, the sensing means and the commutating means being mounted at a distance from each other not greater than the distance between two subsequent elements. We further provide a digital source for representing an amount to be entered into said accumulator, means for generating an impulse for each unit of said amount, means under the control of said generating means for repeatedly operating said commutating means to commutate the elements sequentially presented to the commutating means from a certain one of said two conditions to the other, and means controlled by said sensing means upon the sensing of the first element showing said certain one of said two conditions for stopping said operation of the commutating means beginning from the next following element.

Figure 1:
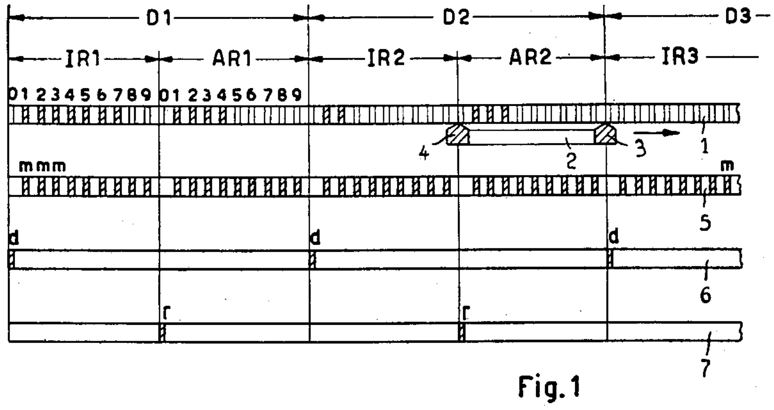
Figure 2:
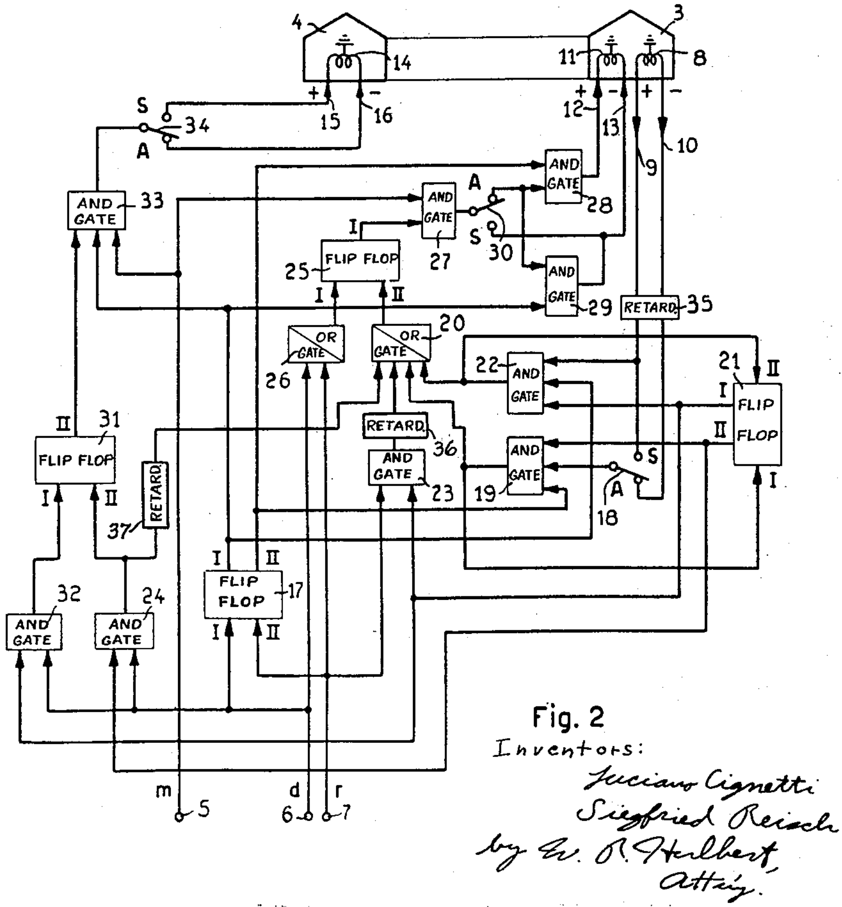

Further objects, features and advantages of the invention will become apparent from the following detailed description of a preferred embodiment thereof, taken in conjunction with the accompanying drawings in which like numerals refer to like parts in the several views and in which Fig. 1 is a schematical representation of the accumulator of a digital computing apparatus embodying the invention;

Fig. 2 is a block diagram of said computing apparatus.

Referring now to Fig. 1 the reference numeral 1 indicates the accumulator, which may be of any suitable type, but which in the present embodiment is of the known magnetic tape or drum type, shown here as developed in a plane. Like the accumulator of the computing apparatus described in the copending application cited hereinbefore, the accumulator 1 is formed of an input register IR and of an accumulating register AR. As shown in Fig. 1, each denominational order of the accumulator 1, such as the orders D1, D2 . . . D*n*, is formed of the corresponding suborders of an input register IR and an accumulating register AR, said suborders being arranged in the sequence IR1, AR1, IR2, AR2 . . . IR*n*, AR*n* along the magnetic track of the accumulator. The amount to which an addend is to be added or from which a subtrahend is to be subtracted is stored in the accumulating register AR, whereas said addend and said subtrahend, respectively, is first entered into the input register IR. The means for preliminarily effecting the entry of said data will not be described here, inasmuch as they are known per se.

A digital unit is entered into the accumulator by applying a magnetic dipole to the magnetic track of the accumulator in a manner known in the art. Though said magnetic track represents a continuous uninterrupted recording medium, it will be supposed here, to make the description easier to understand, that the magnetic track is ideally divided in a number of discrete magnetic spots, referred to hereinafter as cells. A cell wherein a digital unit has been entered will be referred to hereinafter as a cell filled with a positive magnetic point or simply as a filled cell. A cell wherein no digital unit has been entered will be referred to hereinafter as a cell filled with a negative magnetic point or simply as an unfilled cell. Generally speaking, said points may be written, read and erased. A point of a certain polarity is erased when a point of the opposed polarity is written thereon.

Each suborder of both the registers IR and AR comprises ten cells, each cell being represented by a small rectangle in Fig. 1. Since the reference D1 represents the units order, the reference D2 represents the tens order and so forth and inasmuch each filled cell is represented by a shaped rectangle, the amounts which according to Fig. 1 are stored in the accumulator are 27 for the input register IR and 34 for the accumulating register AR.

The accumulator 1 is cyclically rotatable, so as to sequentially present its cells to a commutator device such as a commutator head 2 which, when considered in the relative motion, moves in the direction of the arrow with respect to the accumulator. During a single revolution of the accumulator 1, which defines an accumulator cycle, the denominational orders D1, D2 . . . D*n* of the accumulator 1 pass once the commutator head 2, beginning from the suborder IRI. The commutator head 2 comprises two magnetic heads 3 and 4, respectively. The head 4 is arranged at a distance of a suborder from the magnetic head 3, towards the lower orders.

From the movement of the accumulator various timing signals are derived to control the operations occurring during the computing process. Said signals may be generated by any known means, such as by magnetic tracks rotating together with the accumulator. Fig. 1 shows the tracks 5, 6 and 7, which are integral with the magnetic track of the accumulator 1 and which are cyclically sensed by a corresponding number of suitable magnetic heads, not shown in the drawings. It should be noted, however, that the three magnetic heads sensing the tracks 5, 6 and 7 are vertically aligned, as seen in Fig. 1, with the head 3.

Recorded in the track 5 in correspondence with each suborder of the accumulator 1 are nine signals *m*, which represent the usual clock pulses. Recorded in the track 6 in correspondence with the beginning of each suborder IR1, IR2 etc. is a signal *d*. Recorded in the track 7 in correspondence with the beginning of each suborder AR1, AR2 etc. is a signal *r*. During an accumulator cycle the magnetic tracks 5, 6 and 7 pass once the corresponding magnetic heads.

Referring now to Fig. 2, the magnetic head 3 is provided with suitable sensing means and commutating means, namely a reading coil 8 and a writing coil 11. The reading coil 8 is adapted to send signals through its outputs 9 and 10 according to the polarity of the cells read. More particularly, upon reading a positive point the output 9 is energized and upon reading a negative point the output 10 is energized. The writing coil 11 writes positive points when energized through its input 12 and negative points when energized through its input 13. The magnetic head 4 is provided with a writing coil 14, which is likewise adapted to write positive points when energized at 15 and to write negative points when energized at 16.

The reference numerals 19, 22, 23, 24, 27, 28, 29, 32 and 33 indicate each one an and-gate, which energizes its output when all its inputs are simultaneously energized. The reference numerals 20 and 26 indicate each one an or-gate, which energizes its output when one of its inputs is energized.

The reference numerals 17, 21, 25 and 31 indicate each one a flip-flop which may assume either of two stable states referred to hereinafter as state I and state II. Fig. 2 shows for each flip-flop input the state to which the flip-flop is commutated by an impulse arriving through said input and, for each output, the state of the flip-flop by which said output is energized.

It will be apparent from Fig. 2 that the flip-flop 17 is alternately energized by the signals *d* and *r*, respectively. Thus the instant state of the flip-flop 17 may be regarded as an index to the kind (IR or AR) of the register which is actually presented to the head 3.

The reference numerals 18, 30 and 34 indicate switches which are integral with each other so as to be adapted to be simultaneously shifted from the position of addition (A) shown in Fig. 2 to a position of subtraction (S) and vice versa.

To retard the effect of the reading signals sent by the reading coil 8 a suitable retarding device 35 is provided in the circuit between the sensing means and the commutating means. The amount of the retard caused by said device is not higher than the time occurring between the reading of two subsequent cells. Said retarding device may be formed by a gate or a flip-flop as well, provided said signals arrive duly retarded to the flip-flop 25.

Two other suitable retarding devices 36 and 37 will be provided between the gates 23 and 24, respectively, and the gate 20, so as to retard the signals *d* and *r* conveyed through the gate 20 to the flip-flop 25 with respect to the same signals which are conveyed to the flip-flop 25 through the gate 26.

All the devices cited hereinabove, such as gates, flip-flops, switches and retarding devices are of conventional type. The connections between said devices are clearly shown in Fig. 2 and will not be described in detail.

*Addition*

As has already been described in the copending application, the operation of adding an addend previously entered into the input register IR to an amount stored in the accumulating register AR consists substantially in additively transferring the addend unit by unit from IR to AR. More particularly, a positive point is erased in each suborder IR*n* of the input register at each accumulator cycle and is written into the first unfilled cell of the corresponding suborder AR*n* of the accumulating register. If during a cycle no unfilled cell is found in AR*n*, the positive point picked up from IR*n* is written into the first unfilled cell of the next higher order AR $(n+1)$ and during this cycle no positive point is erased in the corresponding order IR $(n+1)$ of the input register. Moreover all the positive points of the filled up suborder AR*n* are erased. To add a decimal number requires thus ten accumulator cycles, nine cycles being necessary to sequentially erase nine positive points and the tenth cycle being provided for the tens transfer.

According to the invention, the magnetic head 3 invariably writes negative points into all the cells of each suborder of the input register IR until it has written a negative point into the first filled cell of the suborder. Similarly, the head 3 invariably writes positive points into all the cells of the corresponding suborder of the accumulating register AR until it has written a positive point into the first unfilled cell of the suborder. It will thus be apparent that the reading of a cell having a certain condition upon the writing of a point of the opposed condition gives the signal for stopping the writing operation, said signal being effective beginning from the next following accumulator cell.

At the beginning of the first accumulator cycle, when the magnetic head 3 is at the beginning of the suborder IR1, the signal *d* sets the flip-flop 17 to the state I. Moreover, through the gate 26 the flip-flop 25 is set to the state I and, through the gate 32, the flip-flop 31 is set to the state I, the flip-flop 21 being normally at the state I.

As long as the head 3 reads negative points in the suborder IR1, the output 10 of the reading coil 8 will be energized. The signals thus sent to the gate 19 are ineffective because the gate 19 is connected to the state II of the flip-flops 17 and 21. At the same time, since the flip-flop 25 is in the state I, each *m* signal sent to the gate 27 passes the gate 29 and energizes the input 13 of the writing coil 11, thus writing a negative point. As the head 3 reaches the first positive point of the suborder IR1 the output 9 of the coil 8 sends a signal to the gate 22 which sets the flip-flop 21 to the state II, said flip-flop thus storing the unit picked up from the suborder IR1. Moreover, said signal passes the gate 20 and sets the flip-flop 25 to the state II, thus preventing the *m* signals from further energizing the writing coil 11. However, due to the action of the retarding device 35 said prevention will be effective beginning from the cell immediately following said first positive point, whereby the coil 11 will still write a negative point on said first positive point just read. The further signals sent by the output 9 of the reading coil will now be ineffective, since the gate 22 is locked by the state II of the flip-flop 21.

As the head 3 passes from IR1 to AR1 the signal *r* sets the flip-flop 17 to the state II and resets the flip-flop 25 to the state I. The *m* signals are now permitted to pass the gates 27 and 28, thus energizing the input 12 of the writing coil to write positive points into the suborder AR1.

At the same time the signals sent by the output 9 of the reading coil remain ineffective, since the gate 22 is connected to the state I of the flip-flops 17 and 21. As the head 3 reaches the first negative point of the suborder AR1 the coil 11 still writes a positive point and the output 10 of the reading coil sends a signal to the gate 19. Due to the state II of both the flip-flops 17 and 21 this signal passes the gate 19 and sets the flip-flop 25 to the state II, thus preventing the *m* signals from further energizing the writing coil 11 beginning from the cell immediately following said first negative point. Moreover, the signal sent by the gate 19 resets the flip-flop 21 to the state I, the unit stored in said flip-flop having been discharged into the suborder AR1. The state I of the flip-flop 21 thus renders the further signals sent by the output 10 ineffective, the gate 19 being connected to the state II of the flip-flop 21. The next following signal *d* resets the flip-flops 17 and 25 to the state I and the same process is resumed in the denominational order D2.

If during a suborder IR*n* the flip-flop 25 is not set to the state II because there are no positive points in said suborder, the flip-flop 21 remains at the state I and the signal *r*, which passes the gates 23 and 20, sets the flip-flop 25 to the state II, thus preventing the *m* signals to energize the writing coil 11 during the entire suborder AR*n*. At the next following signal *d* the flip-flop 25 is reset to the state I and the energization of the writing coil 11 is again permitted.

Similary, if during a suborder AR*n* the flip-flop 25 is not set to the state II because there are no negative points in said suborder, the flip-flop 21 remains at the state II to which it was set during the preceding suborder IR*n* whereby the unit picked up from the suborder IR*n* remains stored in the flip-flop 21. The signal *d*, which passes the gates 24 and 20, sets the flip-flop 25 to the state II, thus preventing the signals *m* to energize the writing coil 11 during the entire next following suborder IR ($n+1$). At the next following signal *r* the flip-flop 25 is reset to the state I and the energization of the writing coil 11 is again permitted. However, since the last supposed case involves a tens transfer, the magnetic head 4 will now be operated. The signal *d* generated at the beginning of the suborder IR ($n+1$) passes the gate 24 and sets the flip-flop 31 to the state II. Since the gate 33 is now energized by the flip-flops 17 and 31, each *m* signal energizes the input 16 of the writing coil 14 of the head 4 to write negative points into all the cells of the suborder AR*n*, which, as supposed above, was completely filled.

As the head 3 reaches the next following suborder AR ($n+1$) the signal *r* sets the flip-flop 17 to the state II and the gate 33 is locked, thus preventing the writing coil 14 from being further energized, while the energization of the writing coil 11 is again permitted as above. If the suborder AR ($n+1$) has an unfilled cell, the signal sent by the output 10 of the reading coil passes the gates 19 and 20 and sets the flip-flop 25 to the state II, thus preventing the *m* signals from further energizing the writing coil 11 beginning from the cell immediately following said unfilled cell. The writing coil 11 will thus write a positive point into said unfilled cell and so insert the unit carryover in the suborder AR ($n+1$). Moreover, said signal sent by the output 10 resets the flip-flop 21 to the state I, the unit picked up from the suborder IR*n* and stored in said flip-flop having thus been discharged into the suborder AR ($n+1$). The next following signal *d* passes the gates 26 and 32 and resets the flip-flops 25 and 31, respectively, to the state I. The process may now be resumed for the next following denominational order.

If, on the contrary, the suborder AR ($n+1$) has no unfilled cell, the flip-flop 25 remains at the state I during the entire suborder and is set to the state II by the next following signal *d*, as described above in connection with the suborder AR*n*. Moreover, the signal *d* resets the flip-flop 17 to the state I and the gate 33 permits the *m* signals to resume the energization of the writing coil 14. Therefore, as long as the flip-flop 21 remains at the state II, negative points are written into the cells of the suborders of the register AR, while nothing happens in the corresponding suborders of the register IR.

A numerical example will now be described. Taking the digits recorded in the cells of the registers IR and AR shown in Fig. 1, it will be assumed to add 27 to 34. During the first accumulator cycle first the reading coil 8 picks up a positive point from the cell "1" of IR1 and the writing coil 11 writes a positive point into the cell "5" of AR1 and then the reading coil 8 picks up a positive point from the cell "1" of IR2 and the writing coil 11 writes a positive point into the cell "4" of AR2. During the second accumulator cycle a positive point is likewise transferred from IR1 to AR1 and from IR2 to AR2. During the following three accumulator cycles three further positive points are transferred from IR1 to AR1. At the end of the fifth accumulator cycle the suborder IR1 stores two positive points which occupy the cells "6" and "7," AR1 stores nine positive points which occupy the cells from "1" to "9," IR2 has no positive point and AR2 stores five positive points occupying the cells from "1" to "5." During the sixth accumulator cycle the reading coil 8 picks up a positive point from the cell "6" of IR1. Since in AR1 the reading coil 8 finds no unfilled cell, at the end of AR1 the writing coil 11 will not be conditioned to be energized during the suborder IR2, thus being prevented from erasing an eventual positive point in this suborder. Simultaneously, at the end of AR1 the writing coil 14 will be conditioned to erase all the nine positive points of AR1. In the next suborder AR2 the writing coil 11 will again be energized and will write a positive point into the first unfilled cell thereof and thus into the cell "6." During the seventh accumulator cycle the positive point of the cell "7" of IR1 will be transferred to the now unfilled cell "1" of AR1, whereby the result of the addition of 27+34 will be 61.

*Subtraction*

As has already been described in the copending application, the operation of subtracting a subtrahend previously entered into the input register IR from an amount stored in the accumulating register AR consists substantially in subtractively transferring the subtrahend unit by unit from IR to AR. More particularly, at each accumulator cycle a negative point is written both into each suborder IR*n* of the input register and into the first filled cell of the corresponding suborder AR*n* of the accumulating register. If during a cycle no filled cell is found in AR*n*, the negative point is written into the first filled cell of the next higher order AR ($n+1$) and during this cycle no negative point is written into the corresponding order IR ($n+1$). Moreover, a positive point is written into all the unfilled cells of the suborder AR*n*. To subtract a decimal number requires thus ten accumulator cycles, nine cycles being necessary to sequentially write nine negative points and the tenth cycle being provided for the tens transfer.

According to the invention, the magnetic head 3 invariably writes negative points into all the cells of each suborder of the register IR until it has written a negative point into the first filled cell of the suborder. Similarly, the head 3 invariably writes negative points into all the cells of the corresponding suborder of the register AR until it has written a negative point into the first filled cell of the suborder. It will thus be apparent that the reading of a cell having a certain condition upon the writing of a point of the opposed condition gives the signal for stopping the writing operation, said signal being effective beginning from the next following accumulator cell.

Before beginning an operation of subtraction the switches 18, 30 and 34 are shifted to the position of subtraction S.

As long as the head 3 rides over a suborder of the register IR, the mode of operation is the same as that described above for the addition. More particularly, as the head 3 reaches the first positive point of IR1 the signal from the gate 22 sets the flip-flop 21 to the state II to store the unit picked up from IR1. As the head thereupon reaches the suborder AR1 the gate 27 energizes the input 13 of the writing coil 11, thus writing negative instead of positive points into the suborder AR1. As the reading coil 8 reads the first positive point of AR1 the gate 19 sets the flip-flop 25 to the state II, thus preventing the writing coil 11 from further writing negative points beginning from the cell immediately following said first positive point. Moreover, the flip-flop 21 is reset to the state I, the unit stored in said flip-flop having been discharged into the suborder AR1.

When a tens transfer operation occurs due to a suborder of the register AR having no filled cells, said suborder will be filled with positive points, since the gate 33 is now connected to the input 15 of the writing coil 14.

If there are no filled cells in all the higher suborders of the register AR as well, as in the case of a minuend which is smaller than the subtrahend, the head 4 writes positive points into all said suborders. Moreover, the flip-flop 21 storing the unit picked up as above from the register IR will be reset to the state I only when the head 3 reaches the first positive point of the units suborder of the register AR during the next following accumulator cycle, when the unit stored in the flip-flop 21 will be discharged into the suborder AR1. The fugitive one is thus transferred to the units order, this transfer permitting to indicate the character of the amount stored in the accumulating register and to take a true positive total therefrom, provided the negative points are read instead of the positive points.

From the foregoing description it will be evident to those skilled in the art that the invention may with equal facility be applied to other kinds of digital apparatus. For example, the invention may be applied to the counting apparatus described in the copending application cited above.

It will also be understood that many changes may be made in the above diagram, and different embodiments of the invention could be made without departing from the scope thereof. It is therefore intended that all matter contained in the above description or shown in the accompanying drawing, shall be interpreted as illustrative, and not in a limiting sense.

What we claim is:

1. In a digital computing apparatus, an accumulator having a plurality of unit accumulating elements each adapted to be commutated to assume either of two stable conditions, means for sensing said elements, means operable for commutating said elements from a certain one of said two conditions to the other, means for mounting said sensing and said commutating means, said commutating means being enabled to commutate the element actually sensed by said sensing means, means for cyclically moving said accumulator with respect to said mounting means to sequentially present said elements to said sensing and said commutating means, means for sequentially generating a read out pulse for each unit of an amount to be entered into said accumulator, operating means controlled by said generating means for operating said commutating means, means controlled by said sensing means and operable upon the sensing of the first element showing said certain condition for disabling said operating means, and retarding means for rendering said disabling means effective from the next element following said first element.

2. In a digital computing apparatus, an accumulator having an accumulating register with a plurality of unit accumulating elements arranged in denominational suborders and each adapted to be commutated to assume either of two stable conditions, means for sensing said elements, first commutating means operable for commutating said elements from a certain one of said two conditions to the other, second commutating means operable for sequentially commutating said elements suborder by suborder from said other condition to said certain condition, means for mounting said sensing means and said first and second commutating means, said first commutating means being enabled to commutate the element actually sensed by said sensing means, said second commutating means being arranged at a distance of one suborder towards the lower suborders with respect to said first commutating means, means for cyclically moving said accumulator with respect to said mounting means to sequentially present said elements to said first and second commutating means from the lower suborders towards the higher suborders, first means for sequentially generating a read out pulse for each unit of an amount to be entered into said register, second means for generating a timing signal identifying each suborder, means on said accumulator for retarding the presentation of each suborder to said mounting means a fixed period of time with respect to the presentation of the next lower suborder, said period being as long as the presentation of one suborder, third means for generating a timing signal identifying each period, a storing device settable by said first generating means to store a unit to be entered into the suborder actually sensed, first operating means settable under the joint control of said storing device upon being so set and of said second generating means for operating said first commutating means, means controlled by said sensing means and operable upon the sensing of the first element showing said certain condition for unsetting said first operating means and said storing device, retarding means for rendering said unsetting means effective from the next element following said first element, and second operating means settable under the joint control of said storing device upon being so set and of said third generating means for operating said second commutating means.

3. In a digital computing apparatus, an accumulator having a number of denominational orders, said accumulator being subdivided into an input register and an accumulating register, said registers being interspersed whereby each order of the accumulator is formed of the corresponding suborders of said registers, each suborder having a plurality of unit accumulating elements adapted to be commutated to assume either of two stable conditions, means for sensing said elements, means operable for commutating said elements from a certain one of said two conditions to the other, means for mounting said sensing means and said commutating means, said commutating means being enabled to commutate the element actually sensed by said sensing means, means for cyclically moving said accumulator with respect to said mounting means to sequentially present said elements to said sensing means and said commutating means from the lower orders towards the higher orders, first means for generating a timing signal identifying each suborder of said input register, second means for generating a timing signal identifying each suborder of said accumulating register, operating means controlled by said first and second generating means for operating said commutating means, an index device alternately settable to a first stable state and to a second stable state, first disabling means jointly controlled by said first generating means and by said index device upon being set to its first state and operable by said sensing means upon the sensing of the first element showing said certain condition for disabling said operating means and setting said index device to its second state, second disabling means jointly controlled by said second generating means and by said index device upon being set to its second state and operable by said sensing means upon the sensing of the first element showing said other condition for disabling said operating means and setting said index device to its first state, and retarding means for rendering said first and second disabling means effective from the next element following said first element.

4. In a digital computing apparatus comprising an accumulator of the type having its denominational orders arranged on a single magnetic track cyclically movable past a first and a second magnetic head from the lower orders toward the higher orders, a digital unit being entered into said accumulator by recording a certain one of two different magnetic conditions in an elemental area of said track, said accumulator being subdivided into an input register and an accumulating register, said registers being interspersed whereby each suborder of one register alternates with the corresponding suborder of the other register along said track, said first magnetic head comprising a reading coil and a first writing coil, said writing coil being operable for recording either of said two magnetic conditions in the elemental area actually sensed by said reading coil, said second magnetic head comprising a second writing coil operable for recording the other of said two magnetic conditions, said second magnetic head being arranged at a distance of one of said suborders towards the lower orders from said first magnetic head, the combination of first means for generating a timing signal identifying each suborder of said input register, second means for generating a timing signal identifying each suborder of said accumulating register, said first generating means being adapted to operate said first writing coil for recording said other magnetic condition, said second generating means being adapted to operate said first writing coil for recording said certain magnetic condition, first disabling means jointly controlled by said first generating means and by said reading coil and operable upon the reading of the first elemental area showing said certain magnetic condition for disabling said first writing coil, second disabling means jointly controlled by said second generating means and by said reading coil and operable upon the reading of the first elemental area showing said other magnetic condition for disabling said first writing coil, retarding means for introducing a delay substantially as long as the interval between the presentation of two consecutive elemental areas to render said first and second disabling means effective from the next elemental area following said first elemental area, a first bistable multivibrator settable to a first state by said first disabling means and settable to a second state by said second disabling means, third disabling means operable under the joint control of said second generating means and of said first multivibrator upon being set to its second state for disabling said first writing coil, fourth disabling means operable under the joint control of said first generating means and of said first multivibrator upon being set to its first state for disabling said first writing coil, and a second bistable multivibrator settable by said fourth disabling means for operating said second writing coil.

5. In an impulse counting device comprising an accumulator having a plurality of unit accumulating elements each adapted to be commutated to assume either of two stable conditions, means for sensing said elements, means operable for commutating said elements from a certain one of said two conditions to the other, means for mounting said sensing and said commutating means, said commutating means being enabled to commutate the element actually sensed by said sensing means, means for cyclically moving said accumulator with respect to said mounting means to sequentially present said elements to said sensing and said commutating means, means for operating said commutating means during the sequential presentation of said elements, means controlled by said sensing means for disabling said operating means upon the sensing of the first element showing said certain condition, and retarding means between said sensing means and said commutating means to introduce a delay substantially as long as the interval between the presentation of two consecutive elements, said retarding means rendering said disabling means effective from the next element following said first element.

References Cited in the file of this patent

UNITED STATES PATENTS

| | | |
|---|---|---|
| 2,250,847 | Torkelson | July 29, 1941 |
| 2,282,028 | Bryce | May 5, 1942 |
| 2,524,115 | Mumma | Oct. 3, 1950 |
| 2,549,071 | Dusek et al. | Apr. 17, 1951 |
| 2,614,169 | Cohen et al. | Oct. 14, 1952 |
| 2,680,239 | Daniels et al. | June 1, 1954 |
| 2,698,427 | Steele | Dec. 28, 1954 |
| 2,700,148 | McGuigan et al. | Jan. 18, 1955 |
| 2,701,095 | Stibitz | Feb. 1, 1955 |